United States Patent [19]

Yorkanis

[11] 3,927,255

[45] Dec. 16, 1975

[54] BLACK LEVEL CLAMPING CIRCUIT FOR A TELEVISION SIGNAL PROCESSOR

[75] Inventor: Bernard Joseph Yorkanis, South Plainfield, N.J.

[73] Assignee: RCA Corporation, New York, N.Y.

[22] Filed: May 1, 1974

[21] Appl. No.: 465,891

[52] U.S. Cl. .................... 178/7.3 DC; 178/DIG. 26

[51] Int. Cl.[2] .......................................... H04N 5/44

[58] Field of Search . 178/DIG. 26, 7.3 DC, 7.5 DC, 178/7.1, 7.2; 358/34

[56] References Cited

UNITED STATES PATENTS

| | | | |
|---|---|---|---|
| 2,618,703 | 11/1952 | Lowman | 178/7.5 DC |
| 3,159,751 | 12/1964 | Bogdan et al. | 178/7.3 DC |
| 3,288,926 | 11/1966 | Thompson | 178/7.3 DC |
| 3,315,033 | 4/1967 | Sennhenn et al. | 178/7.3 DC |
| 3,463,940 | 8/1969 | Kaye et al. | 178/7.3 DC |
| 3,551,596 | 12/1970 | Borenstein | 178/7.3 DC |
| 3,566,025 | 2/1971 | Rognon | 178/7.3 DC |
| 3,814,952 | 12/1972 | Lynn | 178/DIG. 26 |

*Primary Examiner*—Albert J. Mayer
*Assistant Examiner*—John C. Martin
*Attorney, Agent, or Firm*—Eugene M. Whitacre; Peter M. Emanuel

[57] ABSTRACT

A clamping circuit is included in the video processing section of a television signal processor and is arranged to clamp the pedestal or black level of the video signal to a reference voltage manifesting the black tone output of the receiver. The clamping circuit includes capacitive means responsive to the video signal, a reference voltage source for generating the reference voltage, a current source for generating current for charging the capacitive means, and a unidirectional conducting device for coupling the reference voltage source and the current source to the capacitive means and poled to clamp the signal excursions of one relative polarity developed at the output of the capacitive means to the reference voltage. The reference voltage source is arranged to maintain the reference voltage substantially invariant in response to video signal variation. The current source is peak current limited to prevent the capacitive means from being charged in response to the peaks of noise pulses occurring in the video signal. In a preferred arrangement, means are also provided to prevent the capacitive means from being charged in response to the sync pulse superimposed on the pedestal level.

10 Claims, 2 Drawing Figures

BLACK LEVEL CLAMPING CIRCUIT FOR A TELEVISION SIGNAL PROCESSOR

Figure 1:
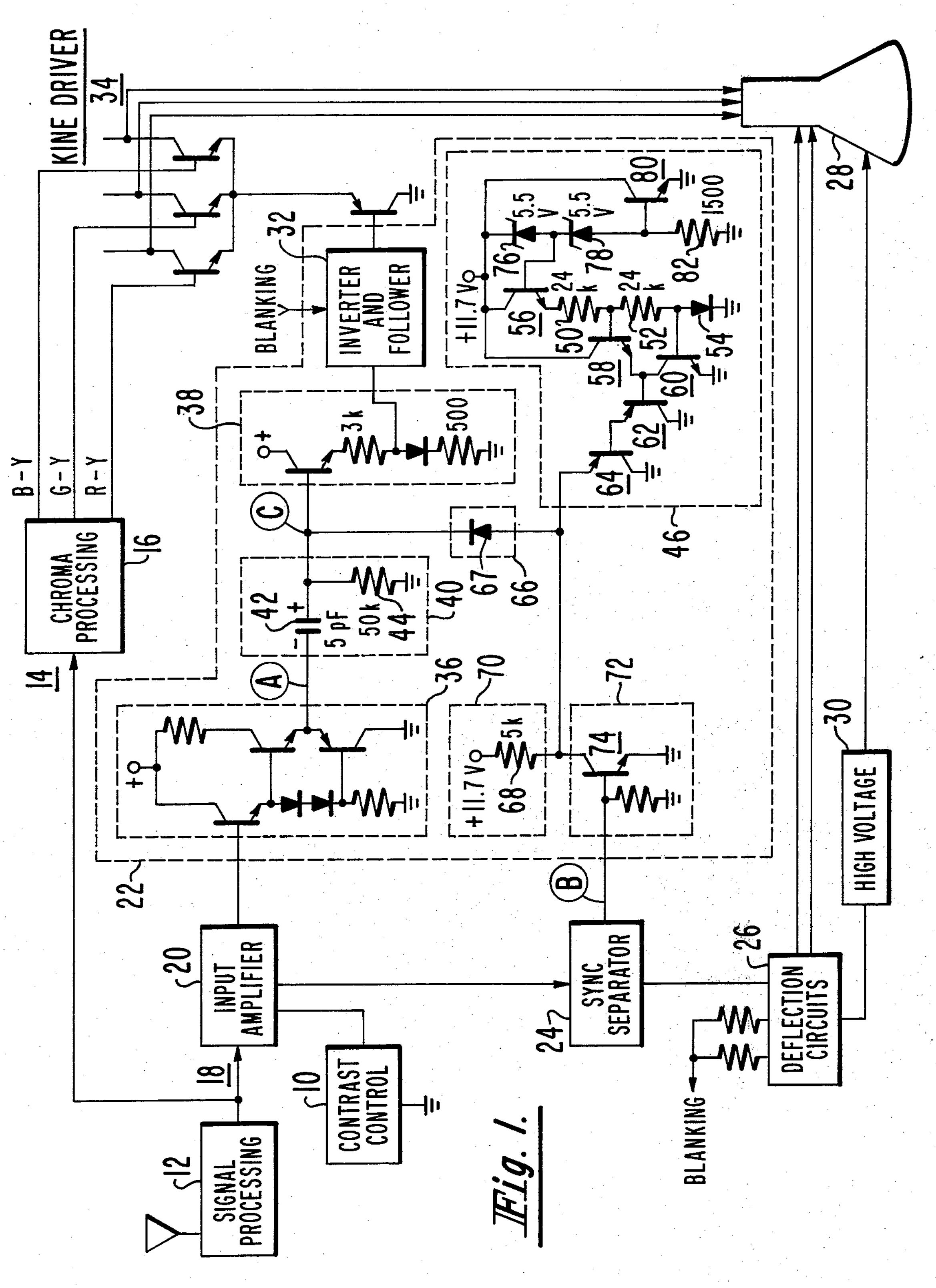

This invention relates to the field of black level clamping circuits utilized in television signal processors (for example, a receiver, monitor or other apparatus).

Television video signals are formed by signal portions representative of image information separated by periodic blanking pulses. The image information serves, in part, to define the tones or gray levels of the images displayed by the image display device (kinescope) of the receiver. The blanking pulses serve, in part, to define an interval for blanking the kinescope at the end of a line, during horizontal retrace, and at the end of a group of lines, known as a field, during vertical retrace. A blanking pulse includes a pedestal level and synchronization pulse superimposed on the pedestal level. The pedestal level is usually taken to manifest the black tone of the original image and, while such pedestal level may differ slightly from a standard black level, it is usually referred to as the black level. Therefore, it is desirable that the kinescope generate the black tone when the amplitude of the video signal substantially equals the pedestal level. It is usually convenient to amplify the video signal in amplification stages. Where these stages are AC coupled or where the DC conditions in such stages vary, the pedestal level of the video signal tends to shift. Thus, it is desirable to eliminate these shifts of the pedestal level and clamp an appropriate portion of the video signal to a reference voltage corresponding to a voltage which, when the pedestal level is suitably applied to the kinescope, causes the kinescope to generate the black tone.

Clamping circuits are known in the art for clamping a signal to a reference voltage. General principles applicable to clamping circuits are described, for example, in PULSE, DIGITAL, AND SWITCHING WAVEFORMS; Millman and Taub; McGraw-Hill Book Company;1965; Chapter 8, "Clamping and Switching Circuits", pp. 262–305. Furthermore, U.S. Pat. No. 2,618,703, granted Nov. 18, 1952, to R. V. Lowman, entitled "Keyed Direct Current Reinsertion Circuit," describes a black level clamping circuit for clamping the pedestal or black level of a television video signal to a reference voltage manifesting the black tone of the kinescope.

Since clamping circuits usually operate to clamp the peak (either a maximum or minimum signal level) of a signal to a reference voltage, it is also desirable that means be provided in black level clamping circuits employed in television receivers to prevent the black level clamping circuit from clamping the peak of the sync pulse, superimposed on the pedestal level, to the reference voltage in order to avoid establishing a voltage which erroneously represents the black tone.

Black level clamping circuits of the type described in the Lowman patent are susceptible to the problem of being set up on noise pulses extending beyond the black level occurring in the video signal. That is, since the black level clamping circuit tends to clamp the peak of the video signal to the reference voltage, peaks of noise pulses extending beyond the black level, rather than the black level, may also be clamped to the reference signal, thereby establishing a voltage erroneously representing the black tone. In addition, the arrangements of prior art clamping circuits do not generally provide for a reference voltage which is substantially invariant in response to variations in the video signal and thereby the black level voltage undesirably varies with the video signal.

In accordance with the present invention, a signal processing circuit for processing a television video signal including signal portions representative of image information separated by periodic blanking pulses, each blanking pulse being formed by a pedestal level and a sync pulse, superimposed on the pedestal level, is provided to clamp the pedestal level to a reference voltage representative of the black tone of the associated image display device. Capacitive means couples the video signal between a first circuit point, coupled to a source of video signal, and a second circuit point, coupled to means for utilizing the video signal. A reference voltage source is normally operative to provide the reference voltage to an output terminal of the reference voltage source through a low output impedance. A current source is coupled to the output terminal of the reference voltage source. A unidirectional coupling device is directly connected between the output terminal of the reference voltage source and the second circuit point and is poled to provide current from the current source to charge the capacitive means toward the pedestal level and couple the reference voltage to the second circuit point when the unidirectional coupling device conducts. The constant current source is peak current limited to inhibit the capacitive means from charging to noise pulse peaks in order to prevent the clamping circuit from readily setting up on noise pulses. since the output impedance of the reference voltage is low, voltage drops developed across the output impedance in response to the video signal of the reference voltage source, tending to change the reference voltage in response to the video signal, tend to be minimized.

In accordance with another aspect of the invention, means are coupled to the output terminal of the reference voltage source for rendering the unidirectional conduction device non-conductive in response to the sync pulses of the video signal in order to prevent the peak of the sync pulses, rather than the pedestal level, from being clamped to the reference voltage.

Other aspects of the present invention are set forth in the following description in conjunction with the accompanying drawing.

FIG. 1 of the drawing shows, partially in block form and partially in schematic circuit diagram form, the general arrangement of a color television receiver employing a black level clamping circuit constructed in accordance with the present invention.

Figure 2:
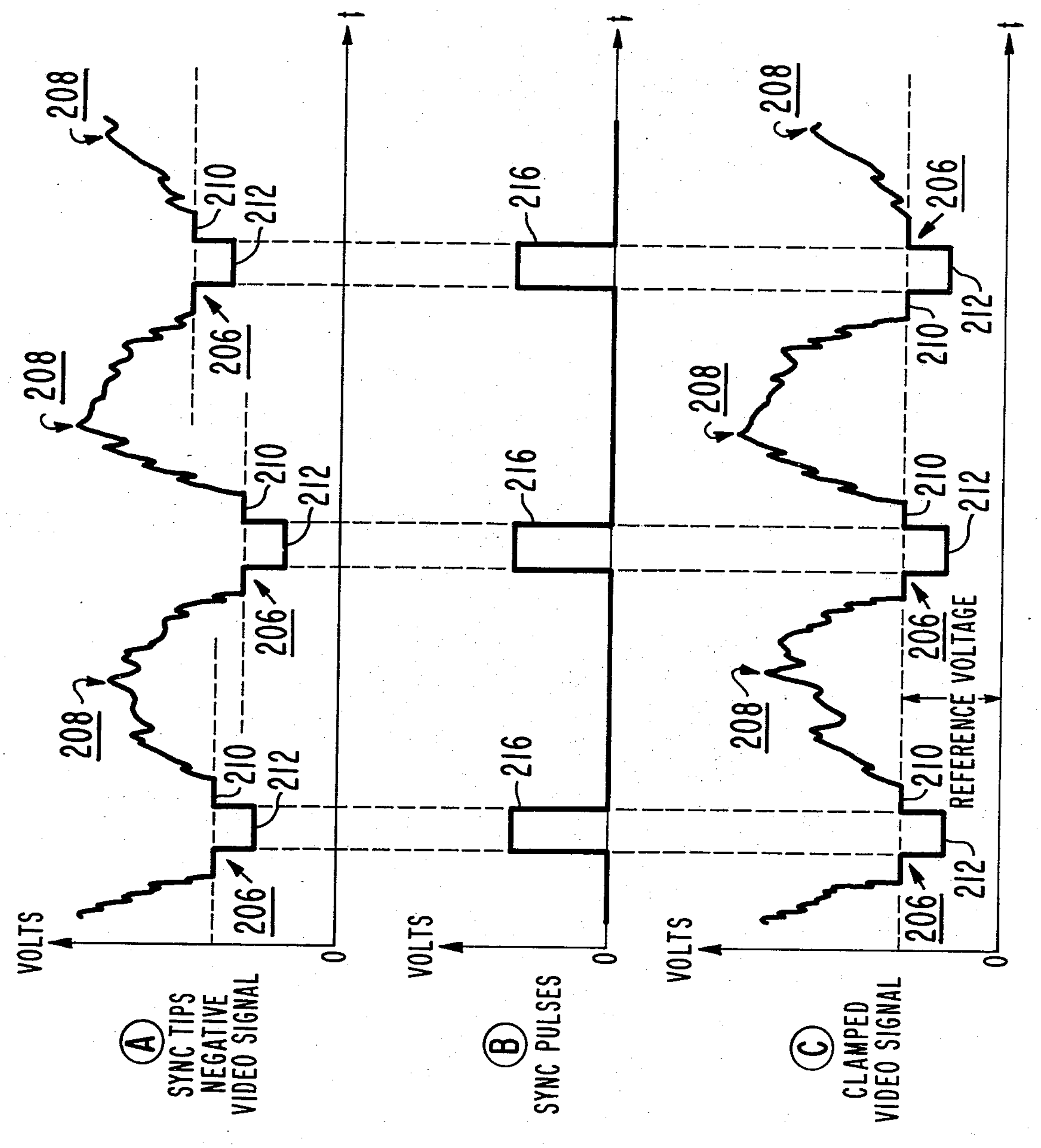

FIG. 2 of the drawing shows certain signal waveforms generated in the receiver shown in FIG. 1 and useful in understanding the present invention.

While the invention may be utilized in other video signal processing apparatus, it is particularly useful in a television receiver and will therefore be described in terms of its use in such apparatus.

Referring now to FIG. 1, the general arrangement of a color television receiver employing the present invention includes a signal processing unit 12 responsive to RF television signals received by an antenna for generating, by means of suitable intermediate circuits (not shown) and detection circuits (not shown), a video signal comprising chrominance, luminance and synchronizing signal portions. The video output of signal processing unit 12 is coupled via suitable networks (not shown) to a chrominance channel 14, including chroma processing unit 16, and via a conventional delay line (not shown) to a luminance or video signal processing channel 18, including input amplifier 20 and luminance processing circuit 22 (enclosed in dotted lines). The output signals of chroma processing unit 16, representing the B-Y, G-Y, and R-Y information, are applied to kine (kinescope) driver 34, where these signals are matrixed with the output (Y) of luminance processing circuit 22. A portion of the amplified video signal of input amplifier 20 is coupled to a luminance processing unit 22 which functions to further amplify and process the video signal, as will be explained, before such processed signal is direct coupled to kine driver 34 through inverter and follower 32, included within luminance processing circuit 22. Contrast control 10 is directly coupled to input amplifier 20 to supply a DC signal to input amplifier 20 to control the amplitude of the video signal and thereby control the contrast of the images produced by the kinescope. A suitable contrast control arrangement is described in copending U.S. patent application Ser. No. 303,021, now U.S. Pat. No. 3,804,981, entitled "Video Signal Processing Circuits", by Jack Avins, filed Nov. 2, 1972 and assigned to the same assignee as the present invention. Another portion of the signal from input amplifier 20 is coupled to a sync separator 24, which separates or strips horizontal and vertical synchronization pulses (see, for example, waveform B of FIG. 2) from the video signal. The sync pulses are coupled from sync separator 24 to luminance processing unit 22 and deflection circuits 26. Deflection circuits 26 are coupled to kinescope 28 and high voltage unit 30 to control the deflection or sweep of an electron beam in kinescope 28 in a conventional manner. Deflection circuits 26 also function to generate a blanking signal from the horizontal and vertical pulses. The blanking signal is coupled to inverter and follower 32 to inhibit the operation of inverter and follower 32 during the vertical and horizontal retrace periods to insure cutoff of the kinescope 28 during these respective periods.

Input amplifier 20 is arranged, for example, to invert the video signal supplied to its input and to produce, at the output of input amplifier 20, what is usually referred to in the art as a sync tips negative video signal. The output of input amplifier 20 (sync tips negative video signal) is coupled to amplifier 36. Amplifier 36 comprises transistors arranged to form a complementary NPN-PNP emitter-follower and serves to couple the sync tips negative video signal output of input amplifier 20 to a capacitive means 40 at substantially unity voltage gain through a low output impedance. The circuit arrangement of amplifier 36 as shown in FIG. 1 is desirable, since it provides a low output impedance for the black level clamping circuit to be described and, because of its complementary device nature, has relatively low current requirements as compared to other possible arrangements. It will be appreciated by those skilled in the art that other circuit arrangements are possible to form amplifier 36, and the arrangement of circuit 36 is shown only by way of example. However, for reasons which should become apparent in the following description of the black level clamping circuit according to the invention, it is preferred that amplifier 36 be arranged to have a low output impedance.

The output of amplifier 36 is coupled to an emitter-follower amplifier circuit 38 through capacitive means 40. The ouput of amplifier 38 is coupled to inverter and follower 32.

Capacitive means 40, a unidirectional coupling device 66, a reference voltage source 46, a current source 70 and a switch 72 forms a black level clamping circuit to clamp the pedestal levels 210 (see waveform A of FIG. 2) of the sync tip negative video signal at the output of amplifier 36 to a reference voltage corresponding to the black image tone of kinescope 28.

As illustrated, capacitive means 40 includes a series capacitor 42 and a shunt bleeder resistor 44.

Reference voltage source 46 is a circuit arrangement for supplying through a low source impedance, a reference voltage corresponding to the black tone of kinescope 28. The reference voltage source 46 comprises a regulated zener diode voltage supply including the series connection of, in the order named, zener diode 76, zener diode 78, and the parallel combination of resistor 82 and the base-emitter junction of transistor 80, coupled across a source of voltage (e.g., +11.7 volts). The parallel combination of resistor 82 and the base-emitter junction of transistor 80 determines the operating current of zener diodes 76 and 78. The relatively stable base-emitter junction voltage of transistor 80 is established across resistor 82 and tends to compensate for temperature variations of zener diodes 76 and 78. The voltage at the junction of zener diodes 76 and 78 is coupled to a voltage divider, comprising the series connection, in the order named, of resistor 50, resistor 52, and diode 54, through the base-emitter junction of NPN transistor 56. The voltage developed at the junction of resistors 50 and 52 essentially forms the reference voltage and corresponds to a voltage which, when suitably coupled to kinescope 28, causes kinescope 28 to generate the black image tone. The voltage divider is so arranged that temperature variations of resistors 50 and 52 are compensated for by the arrangement of transistor 56 and diode 54 and therefore the tolerance of the reference voltage is essentially determined by the tolerance of the ratio of resistors 50 and 52. The junction of resistors 50 and 52 is coupled via NPN transistor 58 to the collector of an NPN transistor 60. The collector of transistor 60 is coupled through Darlington connected PNP transistors 62 and 64 to the output terminal (the emitter electrode of transistor 64) of reference voltage source 46. It should be noted that noted that because of the complementary arrangement of transistor pairs 56,58 and 62,64, the reference voltage established at the junction of resistors 50 and 52 is essentially reproduced at the output terminal of reference voltage source 46. Transistors 56 through 64, it should be appreciated, provide for a low output impedance of reference voltage 46. As will later be explained, the low output impedance of reference voltage source 46 is a feature of the present invention.

The output of reference voltage source 46 is coupled to the capacitive means 40, at the junction of capacitor 42 and resistor 44, through a unidirectional coupling device 66, shown in FIG. 1 as a diode 67.

Resistor 68 is connected to the output of reference voltage source 46 and, in conjunction with a source of voltage (indicated as +11.7 volts in FIG. 1), forms a current source 70. It will be appreciated that although current source 70 is shown as a single resistor (68) coupled to the voltage supply, current source 70 may be formed by any of a number of suitable configurations. It should be noted that another feature of the present invention, for reasons to be explained, is the selection of the current supplying capacity of current source 70. In FIG. 1, the current supplying capacity of current source 70 is determined by the value of resistor 68 and the associated voltage source.

Unidirectional coupling device 66 is poled so that current source 70 may supply current through unidirectional coupling device 66 to capacitor 42, when unidirectional coupling device 66 conducts, to charge capacitor 42 toward pedestal level 210 of the sync tips negative video signal (waveform A of FIG. 2).

The output terminal of reference voltage source 46 is also coupled to the collector of a transistor 74, which in conjunction with resistor 68 forms a switch 72. The base of transistor 74 is coupled to positive going sync pulses (waveform B of FIG. 2) generated by sync separator 24. Switch 72 serves to inhibit the operation of voltage reference source 46 and the conduction of unidirectional coupling device 66 in response to the sync pulses in a manner as will be explained. Although switch 72 is shown as a single transistor common emitter switch, it will be appreciated that other suitable configurations may be used.

The general circuit arrangement shown in FIG. 1 is suitable for use in a color television receiver of the type shown, for example, in RCA Color Television Service Data, 1970, No. T19 (a CTC-49 type receiver), published by RCA Corporation, Indianapolis, Indiana.

It should be noted that a major portion of the circuit arrangement shown in FIG. 1 is suitable for construction as a monolithic integrated circuit.

A description of the operation of the black level clamping portion of the circuit of FIG. 1 will now be undertaken. The conventional portions of a color television receiver will not be described, since their operation is conventional and well-known in the art.

Amplifier 36 generates at its output a sync tip negative video signal (waveform A of FIG. 2). As stated before, the video signal comprises periodic blanking pulses 206 and signal portions 208 representing image information disposed between the blanking pulses. The blanking pulses are formed by a pedestal level 210 upon which are respectively superimposed sync tip pulses 212. The separated sync pulses 216 (waveform B of FIG. 2) generated by the sync separator 24 from the video signal are in phase with and respectively correspond to the sync pulses. Although the pedestal level 210 is generally considered to correspond to the blanking level of the kinescope (slightly blacker than black), it is common to refer to this level as the black level, corresponding to the black tone of the kinescope, and to arrange the receiver circuitry such that the kinescope generates the black tone in response to a video signal amplitude equal to the pedestal or blanking level. In some television receivers the black level may correspond to a level whose absolute magnitude is somewhat below (5 to 7 percent) that of the blanking or pedestal level.

As is shown in waveform A of FIG. 2, where preceding stages are AC coupled or where DC conditions in such stages vary, and where the pedestal level is not clamped, the pedestal level of the video signal shifts. Thus, in essence, areas of a scene may appear lighter than they should, since there is no true black level. The black level clamping circuit formed by capacitive means 40, unidirectional conducting device 66, reference voltage source 46, current source 70, and switch 72 serves to clamp the pedestal level of the video signal to the reference established by reference voltage source 46 to thereby reference the image-representative portions of the video signal to the black tone output of the kinescope and substantially prevent the tonal content of the image produced by the kinescope from shifting incorrectly with shifts in the pedestal level. Waveform C of FIG. 2 represents the output of the black level clamping circuit and indicates that the pedestal level is clamped to the reference voltage.

In operation, assuming that diode 67 and transistor 64 are initially conducting and transistor 74 is initially non-conducting, capacitor 42 is charged toward the minimum value (or negative peak) of the sync tip negative video signal (waveform A) by current supplied by current source 70 (a convention will be assumed here of current flow from a positive voltage level to a negative or less positive voltage level). Capacitor 42 continues to charge until diode 67 is rendered non-conductive, that is, when the voltage at the cathode of diode 67 equals the reference voltage less the forward conduction voltage of diode 67. Therefore, capacitor 42 would normally be charged to a voltage approximately equal (ignoring the voltage drop of diode 68) to the reference voltage less the negative peak of the video signal (the peak of the sync pulse), with the polarity as shown in FIG. 1. However, during each sync pulse interval, transistor 74 is saturated in response to the positive sync pulses supplied from sync separator 24. As a result, the emitter of transistor 64 and the anode of diode 67 are coupled substantially to ground potential, rendering transistor 64 and diode 67 non-conductive. Clamp diode 68 therefore will respond to the most negative portion of the video wave outside of the sync pulse interval. Thus, capacitor 42 does not charge to a voltage equal to the reference voltage less the peak of the sync pulse, but, rather, charges to the reference voltage less the pedestal level 210. Thereafter, since capacitor 42 remains substantially charged (except due to the action of bleeder resistor 44, as will be explained) the voltage at the junction of capacitor 42 and resistor 44 will be equal to the AC portion of the sync tip negative video signal less the pedestal level plus the reference voltage. Thus, the pedestal level is clamped to the reference voltage as shown in waveform C of FIG. 2.

Bleeder resistor 44 is provided to allow capacitor 42 to accommodate variations in the amplitude of the AC portion of the sync tip negative video signal as is known in the clamping circuit art. It should be noted that the impedance in the emitter circuit of amplifier 38 is usually selected to present a high impedance load (e.g., of the order of 300 K) to capacitive means 40 but may be selected so as to present a somewhat lower impedance load to capacitive means 40 so as to serve to discharge capacitor 42 in place of bleeder resistor 44.

The black level clamping circuit, according to the present invention, is particularly effective to establish a reference voltage substantially invariant with the video signal since the Darlington connected emitter-follower transistor 56–64 of reference voltage source 46 provides a particularly low output impedance (e.g., of the order of 20 ohms), thereby tending to minimize voltage drops across the output impedance of reference voltage source 46 due to the video signal. Similarly, the emitter-follower output of amplifier 36 provides a low output impedance (e.g., of the order of 15 ohms) to permit a rapid, controlled response of the clamp circuit determined principally by resistor 68 and reference voltage source 46.

Further, the black level clamping circuit, according to the invention, is particularly effective to inhibit noise, since the value of resistor 68 forming current source 70 is selected to supply a current sufficient to charge capacitor 42 during the pedestal portion of the wave to an appropriate DC level but not sufficient to cause capacitor 42 to charge to the peak of a relatively short duration noise pulse extending beyond the pedestal level. In conjunction with this peak limiting, the time constant established by capacitor 42 and resistor 68 is selected so that such short duration noise pulses cannot readily charge capacitor 42.

It should be noted that resistor 68, as well as supplying current to charge capacitor 42, supplies current to the emitter of transistor 64 to bias transistor 64 into conduction. Thus, when transistor 74 is saturated, current is drawn through resistor 74 substantially decreasing the current supplied to transistor 64 from resistor 68, and transistor 64 is cut-off, thereby, in effect, disconnecting the reference voltage from the anode of diode 67. Similarly, during the occurrence of a noise pulse, current is drawn through diode 67, decreasing the current supplied to transistor 64, and tending to cut off transistor 64, thereby disconnecting the reference voltage from the anode of diode 67, tending to improve the noise immunity of the clamping circuit. Therefore, as long as the charging current flowing through diode 67 is less than the current being supplied to the emitter of transistor 64, capacitor 42 is being charged through the relatively low output impedance of reference voltage source 46. However, when a noise pulse causes the charging current flowing through diode 67 to increase to a value equal to the current available through resistor 68, transistor 64 is cut off with the result that capacitor 42 can only charge through the relatively high impedance of resistor 68. Thus, the black level clamping circuit is effective to rapidly clamp the black level to the reference voltage while being relatively insensitive to noise pulses.

It should be further noted that because of the black level clamping circuit, the DC contrast control voltage from contrast control 10 has substantially no effect on the black level reference.

Typical values of resistors and voltages for the black level clamping circuit according to the invention are shown in FIG. 1.

Although unit 70 is described as a current source, it will be appreciated that this term is intended to include an arrangement for sinking current within a circuit utilizing opposite polarity voltages and, in conjunction therewith, opposite conductivity types of semiconductors and the like. Other modifications of the circuit arrangements apparent to those skilled in the art may also be made within the scope of the present invention and such modifications are intended to be covered herein.

What is claimed is:

1. A circuit for processing a television video signal, said video signal including periodic blanking pulses, each of said blanking pulses formed by a pedestal level and a sync pulse superimposed on said pedestal level, signals representative of image information disposed between said blanking pulses, and undesired noise components, said circuit operative to clamp said pedestal level to a reference level representative of the black tone of an image reproducing device, said circuit comprising:

a source of said video signals;

means for providing said video signals at a first circuit point at a low impedance;

means for utilizing said video signals coupled to a second circuit point;

capacitive means for capacitively coupling said video signals between said first and second circuit points;

a source of reference voltage;

a voltage follower amplifier having an input and an output terminal, said input terminal coupled to said source of reference voltage;

a current source coupled to said output terminal of said follower amplifier;

a unidirectional coupling device direct coupled between said output terminal of said follower amplifier and said second circuit point and poled to charge, when conducting, said capacitive means towards said pedestal level;

said current source including inpedance means for limiting the current for charging said capacitive means to inhibit charging said capacitive means in response to said noise components, said follower amplifier being rendered conductive to provide said reference voltage at said output terminal at a relatively low output impedance when a current above a predetermined value is supplied by said current source to said output terminal, said follower amplifier being rendered substantially non-conductive when said current supplied to said output terminal falls below said predetermined value, said impedance means having a value such that the current supplied to said output terminal of said follower amplifier falls below said predetermined value in response to said noise components; and means coupled to said output terminal of said follower amplifier for rendering said unidirectional coupling device non-conductive and for diverting current from said output terminal of said follower amplifier such that the current supplied to said output terminal of said follower amplifier falls below said predetermined value in response to said sync pulses.

2. The circuit recited in claim 1 wherein said means for rendering said unidirectional coupling device non-conductive includes a switch coupled between said output terminal of said follower amplifier and a first direct potential, said switch being rendered conductive in response to said sync pulses.

3. The circuit recited in claim 2 wherein said switch comprises a semiconductor device having first and second electrodes defining a conduction path and a control electrode for controlling the conduction of said conduction path; said impedance means coupled between a second direct potential and said first electrode, said impedance means and said second direct potential comprising said current source; said second electrode coupled to said first direct potential; and means coupled to said control electrode for rendering said conduction path conductive in response to said sync pulses.

4. The circuit recited in claim 3 wherein said capacitive means includes a capacitor coupled between said first and second points; and wherein the time constant determined by said impedance means and said capacitor is sufficiently large to substantially prevent said noise components from charging said capacitor.

5. The circuit recited in claim 1 wherein said follower amplifier includes an emitter-follower transistor.

6. The circuit recited in claim 5 wherein the output of said emitter-follower is coupled to said output terminal of said follower amplifier through a second emitter-follower, said first mentioned emitter-follower and said second emitter-follower configured in complementary fashion so that there is substantially no voltage drop between said source of reference voltage and said output terminal.

7. The circuit recited in claim 6 wherein said first mentioned emitter-follower and said second emitter-follower comprise complementary Darlington circuits.

8. The circuit recited in claim 1 wherein said means for providing said video signal at said first circuit point is an emitter-follower.

9. The circuit recited in claim 8 wherein said emitter-follower is a complementary semiconductor emitter-follower.

10. A circuit for processing a television video signal, said video signal including periodic blanking pulses, each of said blanking pulses formed by a pedestal level and a sync pulse superimposed on said pedestal level, signals representative of image information disposed between said blanking pulses, and undesired noise components, said circuit operative to clamp said pedestal level to a predetermined reference level representative of the black tone of an image reproducing device, said circuit comprising:

a source of video signals;

a complementary transistor emitter-follower amplifier having an input terminal coupled to said source of video signals and an output terminal coupled to a first circuit point;

means for utilizing said video signals coupled to a second circuit point;

capacitive means for capacitively coupling said video signal between said first and second circuit points;

a source of reference voltage;

an emitter-follower amplifier having an input and an output terminal, said input terminal coupled to said source of reference voltage, said emitter-follower amplifier being conductive to provide said reference voltage at said output terminal at a relatively low impedance when a current above a predetermined value is supplied to said output terminal of said emitter-follower amplifier, said emitter-follower amplifier being rendered substantially non-conductive when the current supplied to said output terminal of said emitter-follower falls below said predetermined value;

a source of current coupled to said output terminal of said emitter-follower amplifier;

a unidirectional coupling device direct coupled between said output terminal of said emitter-follower amplifier and said second circuit point and poled to charge, when conducting, said capacitive means toward said pedestal level;

said source of current including impedance means for limiting the current for charging said capacitive means to inhibit charging said capacitive means in response to said noise components, said impedance means having a value such that the current supplied to said output terminal of said emitter-follower amplifier falls below said predetermined value in response to said noise components; and means coupled to said output terminal of said emitter-follower amplifier for rendering said unidirectional coupling device non-conductive and for diverting current from said output terminal of said follower amplifier such that the current supplied to said emitter-follower amplifier falls below said predetermined value in response to said sync pulses.

* * * * *